(12) United States Patent
Lambert et al.

(10) Patent No.: US 7,947,923 B2
(45) Date of Patent: May 24, 2011

(54) ENCODED OPTICAL ELEMENT OF A LASER PROCESSING HEAD

(75) Inventors: Martin Lambert, Korb (DE); Philipp Herwerth, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1616 days.

(21) Appl. No.: 11/255,072

(22) Filed: Oct. 20, 2005

(65) Prior Publication Data

US 2006/0081576 A1 Apr. 20, 2006

(30) Foreign Application Priority Data

Oct. 20, 2004 (EP) ..................................... 04024921

(51) Int. Cl.
*B23K 26/06* (2006.01)

(52) U.S. Cl. ............ 219/121.73; 219/121.74; 219/121.6

(58) Field of Classification Search ............. 219/121.73, 219/121.74, 121.6; 359/871
See application file for complete search history.

(56) References Cited

U.S. PATENT DOCUMENTS

| | | | | |
|---|---|---|---|---|
| 4,367,017 A | * | 1/1983 | Jimbou et al. | 359/226.1 |
| 4,499,897 A | * | 2/1985 | Roussel | 606/6 |
| 4,684,780 A | * | 8/1987 | Cantello et al. | 219/121.74 |
| 4,728,771 A | * | 3/1988 | Sartorio | 219/121.72 |
| 4,772,772 A | | 9/1988 | Jueptner et al. | |
| 5,208,439 A | * | 5/1993 | Arai | 219/121.74 |
| 5,229,572 A | * | 7/1993 | Ito | 219/121.67 |
| 5,249,082 A | * | 9/1993 | Newman | 359/813 |
| 6,166,868 A | | 12/2000 | Holderer et al. | |
| 6,928,100 B2 | * | 8/2005 | Sato et al. | 372/109 |
| 2002/0003132 A1 | * | 1/2002 | Scalzotto | 219/121.78 |
| 2003/0095345 A1 | | 5/2003 | Yoshida | |
| 2003/0123160 A1 | | 7/2003 | Zeller | |

FOREIGN PATENT DOCUMENTS

| | | |
|---|---|---|
| EP | 0 974 858 | 1/2000 |
| EP | 1 096 415 | 5/2001 |
| JP | 62-028094 | * 2/1987 |

* cited by examiner

*Primary Examiner* — M. Alexandra Elve
(74) *Attorney, Agent, or Firm* — Fish & Richardson P.C.

(57) ABSTRACT

A device for a laser processing head includes an optical element configured for attachment to the laser processing head, a housing for the laser processing head configured to receive the optical element, and a mechanical encoding disposed on at least one of the optical element and the housing to permit installation of a predetermined optical element at a predetermined orientation into the housing.

14 Claims, 3 Drawing Sheets

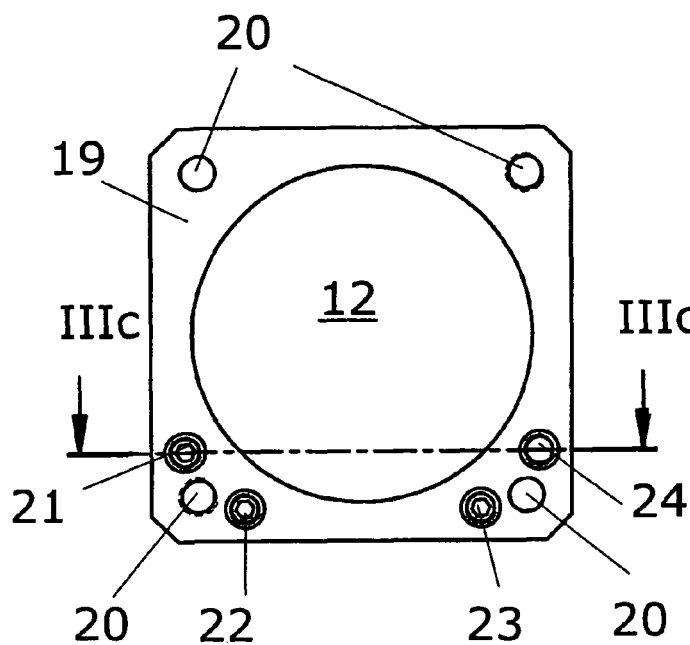
Fig. 3a
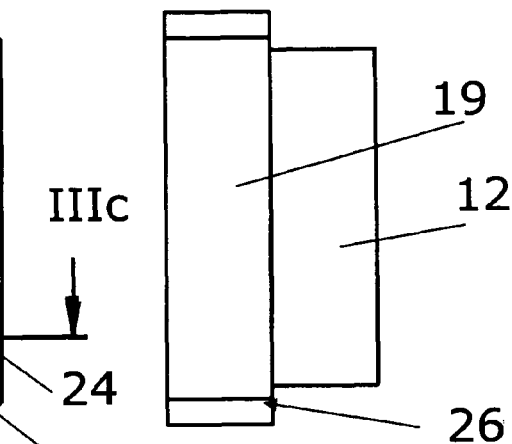
Fig. 3b
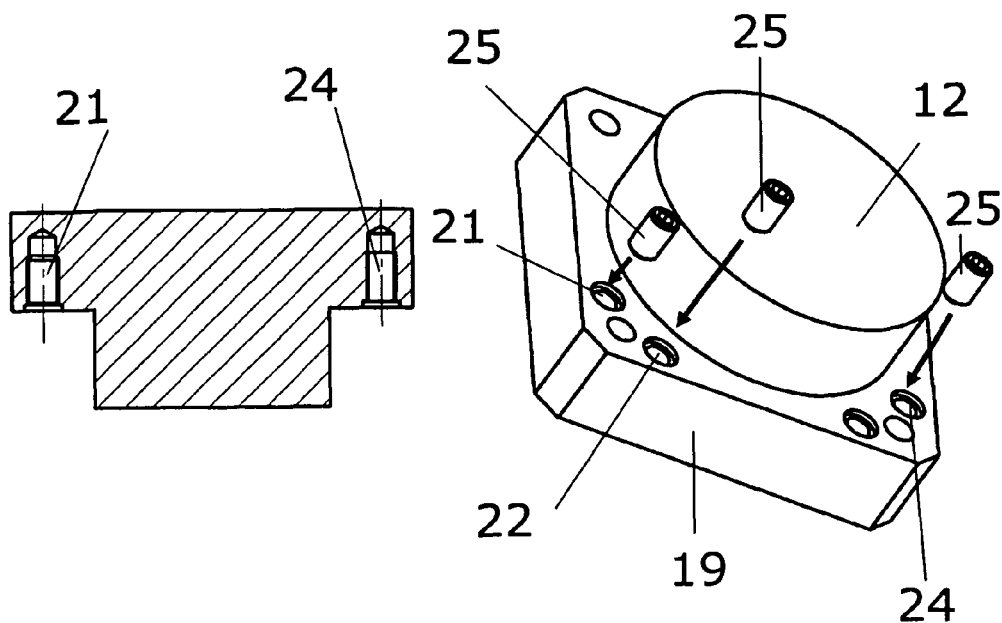
Fig. 3c
Fig. 3d

ENCODED OPTICAL ELEMENT OF A LASER PROCESSING HEAD

CROSS REFERENCE TO RELATED APPLICATIONS

This application claims priority to European Patent Application EP 04024921, filed on Oct. 20, 2004, the entire contents of which are hereby incorporated by reference.

TECHNICAL FIELD

This application relates to optical elements of a laser processing head.

BACKGROUND

Generally, it is difficult and/or impractical to visually distinguish the mirror surfaces of non-planar mirrors such as deflecting mirrors or focusing mirrors of a laser processing head. Unambiguous features of the mirrors can include the material number or labeling. This labeling is applied in a separate working process which bears a very high risk of confusion. To ensure optically correct function, the installation position and orientation of the mirror should be defined. Despite the labeling, mounting errors are possible.

SUMMARY

According to one general aspect, an optical element of a laser processing head is configured to disallow installation of the optical element to the processing head in other than in permissible orientations. In some embodiments, an optical element includes a mechanical encoding disposed on either the optical element, the housing or both the optical element and the housing to permit installation of a predetermined optical element at a predetermined orientation into the housing. The mechanical encoding provides unambiguous identification of the optical element. The location of installation of the optical element, a mirror for example, on the laser processing head is configured such that only the correct optical element can be installed in the correct installation position. The removal of mirrors for cleaning or sending spare parts to customers, for example, can be handled even by less qualified staff without the risk of confusion between disparate optical elements having a similar appearance. This configuration preserves the function of the optical configuration and minimizes the danger of destruction of bordering components due improper installation of optical elements. A laser cutting head housing would, for example, be destroyed by installing a mirror with excessive focal length.

The mechanical encoding can include at least one profile and at least one complementary recess which cooperates with the profile. In some embodiments, the mechanical encoding includes a profile on the optical element, which may be in the form of teeth, projections, curvatures or elevations or the like which can be inserted into a corresponding depression or recess of the laser processing head. In some embodiments, the mechanical encoding includes a profile, such as a depression and/or recess, for example, on the optical element and/or on the laser processing head.

In some embodiments, the optical element includes threaded holes into which threaded pins can be screwed. This design permits to select and quickly implement the encoding (number and position of the pins). In some embodiments, the encoding is made permanent by gluing in the threaded pins.

Various embodiments are suited for a plurality of components of a laser processing head, such as mirrors, for example, on which the encoding may be applied as follows: The mirror is mounted to a carrier to be mounted to the housing of the laser processing head which includes the mechanical encoding.

Other features will be apparent from the description, the drawings and the claims.

DESCRIPTION OF DRAWINGS

FIG. 3a shows a top view of a mirror of the laser cutting head;

FIG. 3b shows a side view of the mirror of the laser cutting head;

FIG. 3c shows a section through IIIc-IIIc of FIG. 3a of the mirror of the laser cutting head; and FIG. 3d shows a perspective view of the mirror of the laser cutting head.

DETAILED DESCRIPTION

Figure 1:
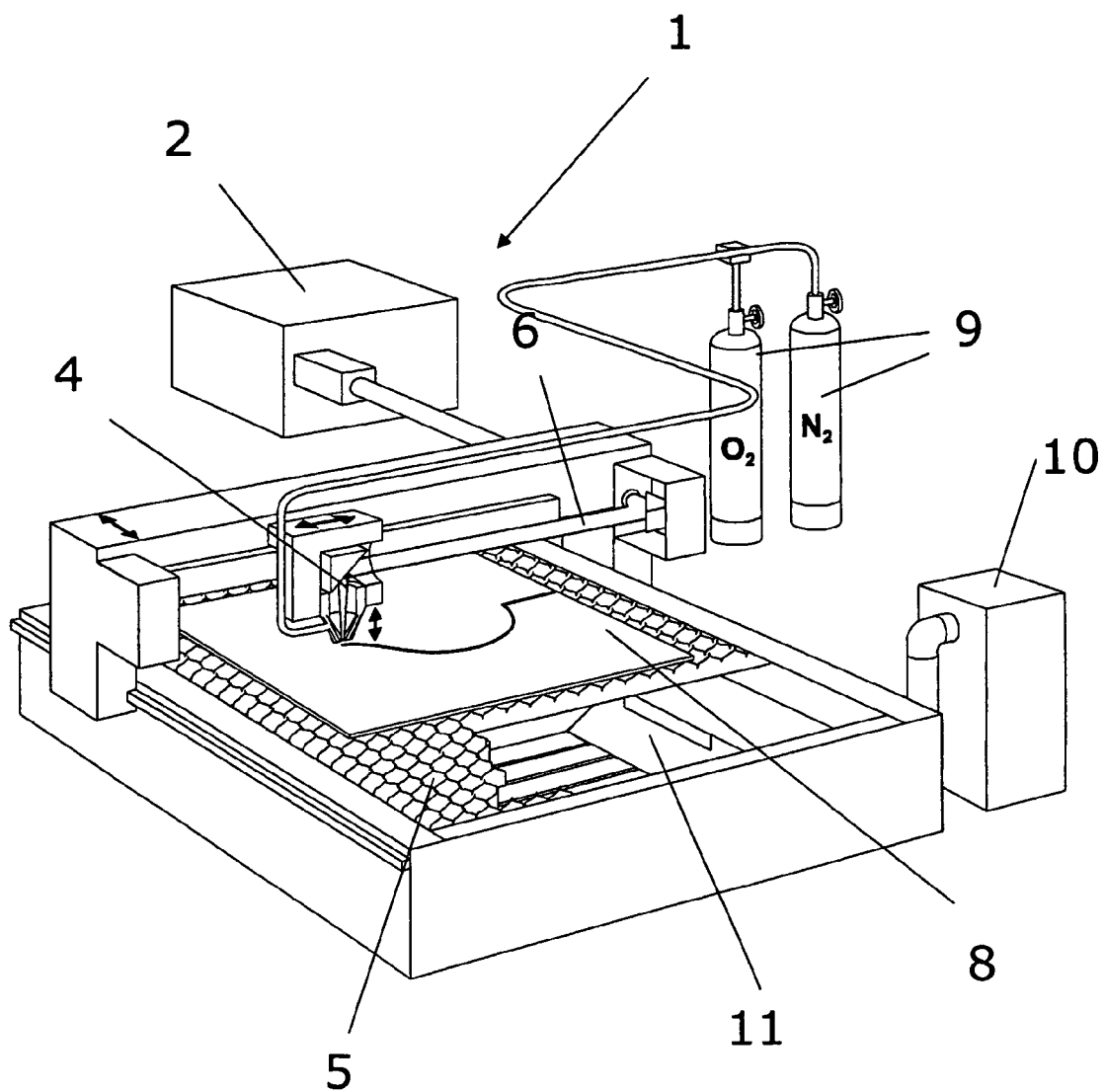
FIG. 1 shows a perspective top view of a laser cutting system.

FIG. 1 shows the construction of a laser cutting system 1 for laser cutting using a $CO_2$ laser 2, a laser processing head 4 and a workpiece support 5. A generated laser beam 6 is guided by means of deflecting mirrors to the laser processing head 4 and is directed onto a workpiece 8 using mirrors. In some examples, the workpiece is sheet metal.

The laser beam 6 must penetrate through the workpiece 8 to produce a continuous kerf. The workpiece 8 must be spotwise melted or oxidized at one location and the molten mass must be blown out. The piercing process can be performed rapidly (i.e. with full laser power) or slowly (via a so-called "ramp").

In case of slow piercing of the workpiece 8 with a ramp, the laser power can be gradually increased, reduced and be kept constant over a certain period until the pierced hole is generated. Piercing and also laser cutting are supported by adding a gas. Oxygen, nitrogen, pressurized air and/or application-specific gases can be used as cutting gases 9. Which gas is eventually used depends on the materials to be cut and on the required quality of the workpiece 8.

Cutting with oxygen is usually performed using a gas pressure of maximally 6 bars. The material is molten and largely oxidized at the location where the laser beam 6 meets the workpiece 8. The produced molten mass is blown out together with the iron oxides. The particles and gases produced can be suctioned out of a suction chamber 11 using a suction means 10. During oxidation (exothermal reaction) additional energy is released which promotes the cutting process. If oxygen is used as cutting gas for a material thickness which permits use of the same laser power for oxygen cutting as well as nitrogen high-pressure cutting, the processing cutting speeds may be considerably higher or the material thickness to be cut may be larger compared to nitrogen.

Figure 2:
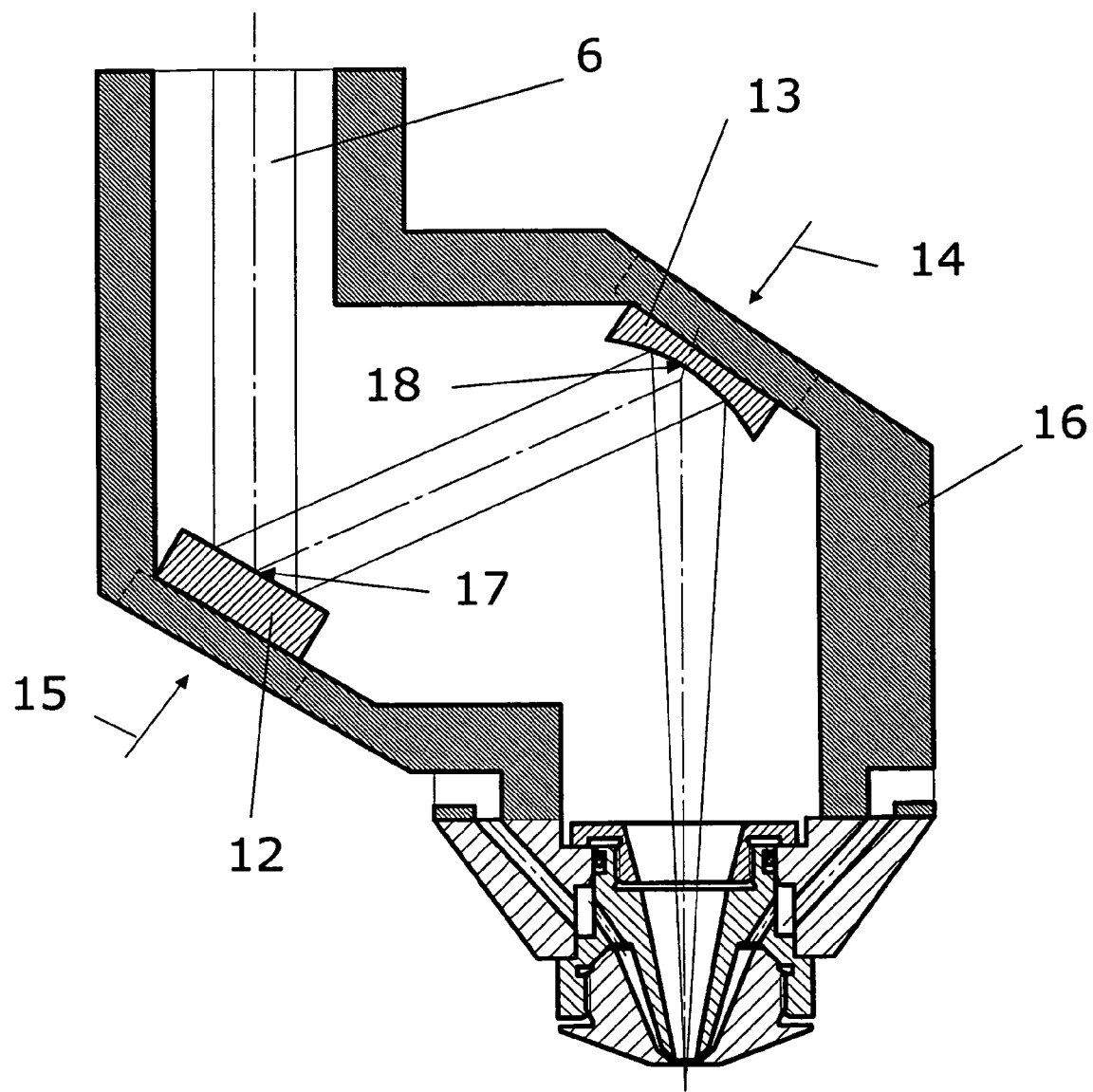
FIG. 2 shows a longitudinal section of parts of the laser cutting head of the laser cutting system.

In accordance with FIG. 2, a deflecting mirror 12 and a focusing mirror 13 are provided to direct the laser beam 6 onto the workpiece. It is possible to produce a gas jet coaxially to the laser beam 6 using an annular gap nozzle without requiring a transmissive element as a sealing element to build up pressure. The two mirrors 12 and 13 are inserted in receptacles of a housing 16 in the direction of arrows 14 and 15, respectively. The two mirrors 12 and 13 of FIG. 2 are depicted differently in order to clearly show their function. In some embodiments, the mirrors 12 and 13 are almost identical, with only their mirror surfaces 17 and 18 being different. The two mirrors are mechanically encoded for differentiation, which is explained with reference to the example of the deflecting mirror 12.

In accordance with FIGS. 3a through 3d, the deflecting mirror 12 is mounted to a carrier 19 which is inserted into the receptacle of the housing 16 of the laser cutting head 4. The carrier 19 can be mounted to the housing via bores 20. The carrier 19 comprises additional threaded holes 21 to 24 into which threaded pins 25 can be inserted and glued such that the threaded pins project beyond the carrier 19 and protrude over its carrier surface 26. The mechanical encoding consists of the number and position of the threaded pins. The receptacle on the laser cutting head has at least one depression for inserting a threaded pin in correspondence with the encoding. In some examples, encoding may be provided by inserting threaded pins into the bores 21, 22 and 24 and providing three corresponding depressions on the housing of the laser cutting head.

What is claimed is:

1. A system for laser processing, the system comprising
   (a) a laser processing head;
   (b) a plurality of optical elements, each comprising a carrier configured for attachment to the laser processing head; and
   (c) a mechanical encoding system comprising one or both of
      (i) a profile on at least one of the carriers that unambiguously identifies a first of the plurality of optical elements and a complementary recess in the laser processing head that cooperates with the profile when the first optical element is installed, and
      (ii) a recess in at least one of the carriers that unambiguously identifies a first of the plurality of optical elements and a complementary profile on the laser processing head that cooperates with the recess when the first optical element is installed;
   wherein the mechanical encoding system presets an admissible installation of the first optical element into a correct installation position in the laser processing head and prevents installation of the first optical element into an incorrect installation position.

2. The system according to claim 1, wherein the laser processing head comprises a housing that comprises one or both of the recess and the profile.

3. The system according to claim 1, wherein at least one carrier comprises holes configured to receive pins.

4. The system according to claim 3, wherein the pins are threadably connected to the holes.

5. The system according to claim 3, wherein the pins are connected to the holes with an adhesive.

6. The system according to claim 1, wherein at least one of the optical elements comprises a mirror.

7. The system according to claim 1, wherein the profile comprises at least one of teeth, curvatures, and elevations sized and configured to be received in a corresponding recess.

8. The system according to claim 1, wherein the profile comprises a plurality of pins attached to the carrier or the laser processing head in predetermined positions corresponding to a plurality of predetermined recesses in the laser processing head or the carrier, such that the carrier is attachable to the laser processing head in only a single permissible installation position.

9. The system according to claim 8, wherein the carrier is attachable to the laser processing head in a plurality of predetermined permissible orientations.

10. The system according to claim 1, wherein the profile comprises at least one of teeth, curvatures, and elevations which are sized and configured to be received in a corresponding recess.

11. A method for installing an optical element in a designated installation position on a laser processing head, the method comprising:
    providing an optical element configured for attachment to the laser processing head, a housing for the laser processing head configured to receive the optical element; and a mechanical encoding disposed on at least one of the optical element and the housing to permit at least one predetermined installation position of the optical element when inserted into the housing;
    aligning the optical element into a predetermined permissible installation position permitted by the mechanical encoding; and
    inserting the optical element into the predetermined permissible installation position in the housing of the laser processing head,
    wherein the mechanical encoding comprises one or both of
       (i) a profile on the optical element that unambiguously identifies the optical element and a complementary recess in the housing that cooperates with the profile when the optical element is installed, and
       (ii) a recess in the optical element that unambiguously identifies the optical element and a complementary profile on the housing that cooperates with the recess when the optical element is installed.

12. The system according to claim 1, wherein at least the first optical element is attachable to the laser processing head housing in a single predetermined permissible orientation.

13. The system according to claim 8, wherein the carrier is attachable to the laser processing head housing in a single predetermined permissible orientation.

14. The method of claim 11, wherein the mechanical encoding permits a single permissible orientation for the optical element when inserted into the permissible installation position.

* * * * *